United States Patent [19]

Koch et al.

[11] Patent Number: 4,483,382
[45] Date of Patent: Nov. 20, 1984

[54] TIRE BEAD WITH LAYER OF CELLULAR ELASTIC MATERIAL BENEATH BEAD CORE

[75] Inventors: Wolfgang Koch, Useldange; Thomas Welter, Keispelt, both of Luxembourg

[73] Assignee: The Goodyear Tire & Rubber Company, Akron, Ohio

[21] Appl. No.: 531,980

[22] Filed: Sep. 14, 1983

[51] Int. Cl.³ .............................................. B60C 15/06
[52] U.S. Cl. ................................. 152/362 R; 152/374; 152/DIG. 9; 152/362 CS
[58] Field of Search ............ 152/362 R, 362 CS, 374, 152/355, 353 R, 353 C, 353 G, DIG. 9

[56] References Cited

FOREIGN PATENT DOCUMENTS

| 860151 | 7/1949 | Fed. Rep. of Germany ... 152/362 R |
| 1086142 | 7/1960 | Fed. Rep. of Germany ...... 152/362 CS |
| 1216276 | 4/1960 | France ........................... 152/362 R |

Primary Examiner—Lois E. Boland
Attorney, Agent, or Firm—Frank Pincelli

[57] ABSTRACT

A tubeless pneumatic tire having a pair of beads characterized in that the area of the bead beneath the bead core comprises a layer of cellular elastomeric material.

3 Claims, 3 Drawing Figures

TIRE BEAD WITH LAYER OF CELLULAR ELASTIC MATERIAL BENEATH BEAD CORE

The invention relates to a tubeless pneumatic tire comprising a bead with a substantially conical base portion, which, when mounted on a rim, engages into an airtight seal with the conical bead seat portion of the rim.

Tubeless tire and rim assemblies in which a conventional inner tube is dispensed with, have been known for a long time. The primary sealing zone is formed by the bead seat which extends between the so-called heel and toe regions of the bead. As a sealing zone, this zone is preferred to the lateral zone which is formed by the flange of the rim and the corresponding portion of the bead. The flange of the rim is subject to deformations as a result of impact with obstacles. The relatively stiff rubber layer in the bead region cannot readily adjust to these deformations which often leads to a fault in the airtight seal.

If for any reason the internal air pressure falls, the force that keeps the beads in their normal place against the flanges is reduced. When a lateral force is applied to the wheels, for example during cornering, the tire bead may be dislodged which will result in the airtight seal being broken.

A reduction of the internal air pressure can be total, due to a puncture for example, but more often the reduction in air pressure is a partial drop due to a leaking valve, air migration through the carcass etc.

Under normal driving conditions this drop in air pressure, even if substantial over extended periods of time, does not present a great danger.

However, under harder service conditions, the pressure drop may result in a dislodging of the tire from the rim seat, whereupon directional control of the vehicle is lost. This is generally referred to as roll-off.

Many attempts have been made in the prior art to design tire/rim assemblies which keep the tire in its place in case of a total pressure loss. The proposed assemblies usually rely on bead spacer rings or similar devices or they foresee some form of interlocking of the tire and a specially designed rim. Although most of these devices will keep the tire in a normal position on its rim under reduced inflation pressure, the prior art does not mention a simple and effective means to improve only the so-called roll-off performance of a tire.

The object of the present invention is to provide a tubeless pneumatic tire which, when mounted on a standard rim, has an improved tendency to remain seated in its normal position on the rim even when the inflation pressure drops well below its recommended optimum value. The invention is characterized in that the area of the bead, which is axially limited by two planes A, B which pass through the outermost edges of the bead core in the axial direction of the tire and which area is radially limited by the conical section surface F of the bead seat and by a conical surface E parallel thereto and passing through the radially innermost edge of the bead core, comprises a layer of cellular elastic material which in axial direction extends at least up to planes A, B and in radial direction has a thickness which lies in the range of 0.3 to 0.8 times the distance between conical surfaces E and F.

The invention will now be described with reference to the accompanying drawings.

Figure 1:
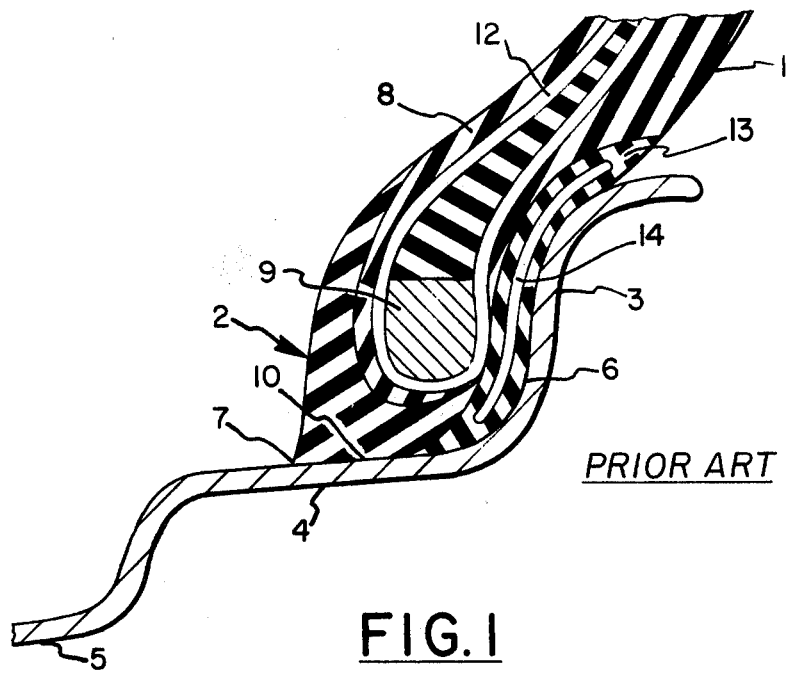
FIG. 1 illustrates a cross section of a bead of a prior art tire.

FIG. 1 shows a cross-section of a bead of a conventional prior art tire. A tubeless tire has a sidewall 1 which terminates in tire bead 2. Bead 2 comprises a bead base 10, which extends from the bead toe 7 to the heel 6 and a bead core 9. Chafer layer 13, which may be reinforced by a textile layer 14, is situated in the heel area of the bead. The rim shown in FIG. 1 is a standard rim comprising a flange 3, a bead seat portion 4 and a well 5. The tire bead engages in an airtight seal with the rim. The heel 6 of the bead is situated in that part of the rim where the seat 4 meets the flange 3. The bead toe 7 rests on that part of the bead seat which terminates in the rim well. The cords 12 of one or more carcass plies are wrapped around bead core 9. An air retention layer 8 is disposed on the inside of the tire cover.

The invention is based on the following considerations:

The dislodging of a tire of the prior art from the rim under low inflation pressure will most likely happen when a lateral force is applied to the wheel of the vehicle. Under the influence of the lateral force, which is applied to the tire in the tread area, a large tension is applied to the radial carcass cords 12 in the footprint area. The carcass cords 12 which are anchored around the bead core 9 exert a pulling force on the bead core 9 away from the rim. This results in a loss of compression force in the bead seat area which may lead to a dislodging of the bead from the rim.

Whereas it is difficult to measure this change in compression force as a function of the lateral force, it is possible to measure it in an equivalent situation. The reduction of compression force is a result of the increased distance of the bead core to the rim, situation which also occurs when a tire is mounted on a rim with a diameter that gradually decreases from its nominal diameter.

Figure 2:
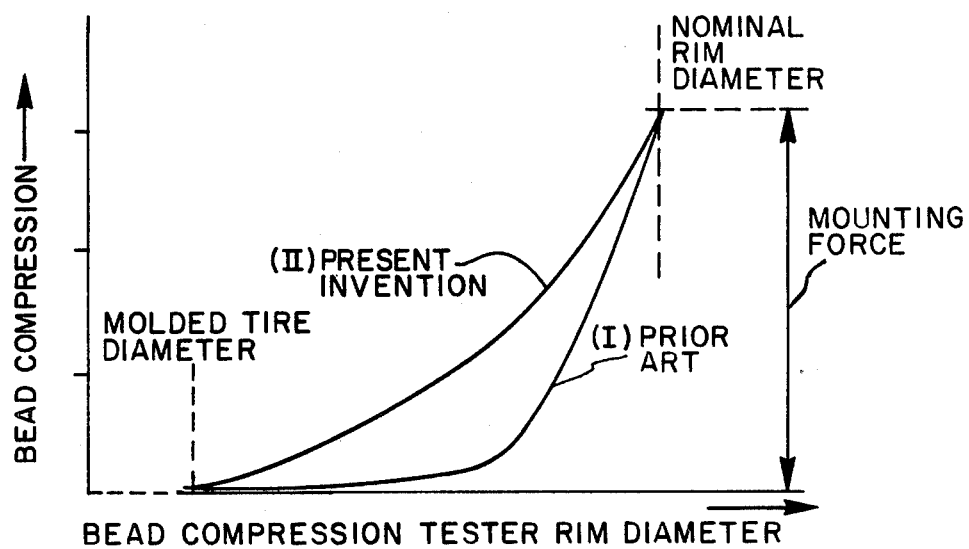
FIG. 2 illustrates the variation of the compression force of a prior art bead and of a bead according to this invention as a function of rim diameter such as measured on a bead compression tester.

Curve I of FIG. 2 shows the typical variation of the bead compression force of a standard tire of size 175 SR 14 as a function of the rim diameter. This curve was plotted on a machine commonly called: bead compression tester, type WKM made by Gebr. Hofmann GMBH of Pfungstadt, Germany. It can be seen that for a standard bead construction, the variation of the force against rim diameter varies sharply just below the bead seat mounting force MF (compression force under rated inflation pressure).

As explained above the tension in the carcass cords displaces the bead core away from the rim. A small displacement may considerably reduce the compression force which will no longer be sufficient to counterbalance the lateral force.

Curve II of FIG. 2 illustrates the expected compression graph of a bead construction according to the present invention. By providing a cellular elastic material in the compression area, it is possible to give the compression force versus rim diameter function in the region below the bead seat mounting force MF a slope which is smaller than that of a standard construction exemplified by curve I.

Figure 3:
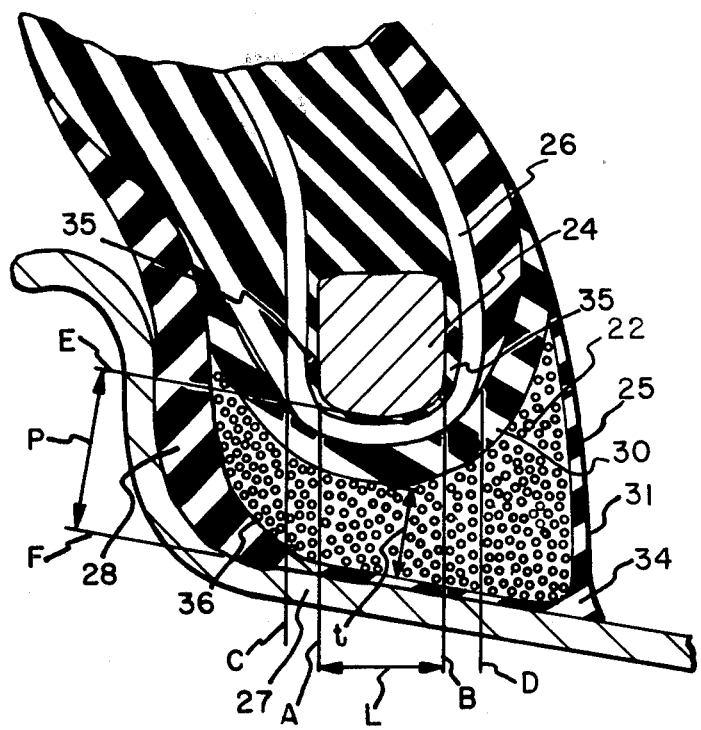
FIG. 3 illustrates a cross section of a bead of a tire according to the present invention.

FIG. 3 illustrates a preferred embodiment of the invention.

The bead comprises a core 24 around which a ply 26 of the carcass is wrapped. Chafer layer 28, which may be reinforced by a textile layer, is situated in the heel area of the bead.

The area of the bead situated between the bead core and the bead seat comprises a first hard rubber layer 30, which is in contact with the carcass ply 26 and a second layer 22 of cellular elastic material. A third layer 25 of an air impermeable rubber preferably forms the outer surface which comes into contact with the rim to make an airtight seal. This layer preferably also forms the innermost surface of the tire, generally referred to as inner liner.

The cellular elastic material 22 consists of a vulcanizable polymeric material, generally referred to as compound, which after cure comprises gas-filled microcapsules or cavities. These cellular materials, which are well known in the art, can be manufactured by adding a certain amount of a substance which, during the vulcanization process, releases a gas. The gas that is released throughout the compound remains trapped inside the compound and creates small independent cavities. By carefully controlling the amount of gas-releasing ingredient added as well as the processes of mixing and vulcanization, a cellular elastic material can be obtained with the desired compressibility characteristics.

The following compounds are examples of nitrogen releasing agents when heated above 120° C.:

Benzene-1,3-disulfohydrazide
Dinitrosopentamethylenetetramine
Azodicarbonamide

The compressibility of the cellular material is closely related to the volume of the gas-filled cavities that are present in the material. It is preferred that the volume of the gas-filled cavities or capsules in the elastic material represents between 10 and 50% of the total volume of the cellular material.

The high compression zone in the bead area of a tire which is mounted on a rim and inflated to its rated pressure, is centered in that area of the bead which is situated between the bead core 24 and the bead seat 27. This area can be defined in the axial direction of the tire as extending between two planes A and B which are parallel to the mid-centerplane of the tire and which pass through the outermost edges 35 of the bead core 24 in the axial direction.

In the radial direction, perpendicular to the rotation axis of the tire, the high compression zone is limited by the conical sections F and E, formed by the bead seat 27 and by a conical surface parallel thereto and passing through the radially innermost edge 29 of the bead core towards the bead seat 27.

This zone of high compression contains a layer of cellular material which preferably extends beyond this zone in axial direction towards the heel 36 of the bead and into the bead toe 31. If L is the distance between A and B, it is preferred that the cellular material extends beyond planes A and B into a zone which is defined by planes C and D distant from planes A and B respectively by $\frac{1}{3}$ of L.

In FIG. 3 the cellular material 22 is bordered in the radial direction by a rubber layer 30 and by an impermeable layer 34 contacting the rim. The presence of these two layers 30, 34, although not indispensible for a good working of the invention, give the bead construction more durability. In particular the bead area that comes into contact with the rim flange needs to be wear resistant and the outside layer of the bead toe must also be sufficiently strong in order not to be damaged when the tire is mounted or dismounted.

The thickness (in radial direction) of the cellular material 22 depends on the compressibility of the material used, i.e. on the percentage (in volume) of gas-filled cavities. The distance P separates conical surfaces E and F. Preferably the cellular material has a thickness t, as measured perpendicular to the conical surfaces, in the region beneath the bead core 24 bound by planes A and B which ranges between 0.3 and 0.8 of the distance P.

Whereas the specific embodiment of this invention has been described in terms of a cellular elastic material it is evident from the preceding description that any material with similar compressibility characteristics could be used.

We claim:

1. A tubeless pneumatic tire comprising a bead with a substantially conical base portion, which, when mounted on a rim, engages into an airtight seal with the conical bead seat portion of the rim, characterized in that the area of the bead which is axially limited by two axial spaced apart planes which are parallel to the mid-circumferential plane, the first axial plane of said axial planes passing through the axially outermost edge of the bead core and the second axial plane of said axial planes passing through the axially innermost edge of the bead core, and which area is radially limited by a first conical section surface of the bead seat and by a second conical surface parallel thereto and passing through the radially innermost edge of the bead core, comprises a layer of an air impermeable material and radially outwardly thereof a layer of cellular elastic material which in axial direction extends at least up to the first and the second axial planes and in radial direction has a thickness which lies in the range of 0.3 to 0.8 times the distance between the first and the second conical surfaces.

2. The tire according to claim 1 further characterized in that the volume of the gas-filled cavities of the cellular elastic material represents between 10 and 50% of the total volume of the material.

3. The tire according to claims 2 or 3 further characterized in that the cellular material extends beyond the first and the second axial planes at least into a zone which is defined by third and fourth axial planes parallel to the mid-circumferential plane and distant respectively from the first and the second axial planes by $\frac{1}{3}$ of the distance that separates the first and second axial planes.

* * * * *